United States Patent
Tschäschke et al.

[11] Patent Number: 5,806,923
[45] Date of Patent: Sep. 15, 1998

[54] IMPACT PROTECTION DEVICE IN A MOTOR VEHICLE HAVING A VEHICLE SEAT

[75] Inventors: Ulrich Tschäschke, Ehningen; Frank Zerrweck, Stuttgart, both of Germany

[73] Assignee: Daimler-Benz Aktiengesellschaft, Stuttgart, Germany

[21] Appl. No.: 891,876

[22] Filed: Jul. 9, 1997

[30] Foreign Application Priority Data

Jul. 12, 1996 [DE] Germany ............... 196 28 108.3

[51] Int. Cl.⁶ ........................................ B60N 2/42
[52] U.S. Cl. ........................ 297/216.13; 297/464
[58] Field of Search ................. 280/730.1, 730.2, 280/748, 749; 297/216.1, 216.13, DIG. 3, 452.41, 468, 487, 464

[56] References Cited

U.S. PATENT DOCUMENTS

| | | |
|---|---|---|
| 2,025,822 | 12/1935 | Pryor . |
| 2,606,727 | 8/1952 | De Haven . |
| 3,096,957 | 7/1963 | Peterson et al. . |
| 3,957,304 | 5/1976 | Koutsky et al. . |
| 4,592,523 | 6/1986 | Herndon . |
| 5,295,729 | 3/1994 | Viano . |
| 5,366,268 | 11/1994 | Miller et al. . |
| 5,468,045 | 11/1995 | Weber . |
| 5,474,329 | 12/1995 | Wade et al. . |
| 5,651,582 | 7/1997 | Nakano . |

FOREIGN PATENT DOCUMENTS

| | | |
|---|---|---|
| 0565501A1 | 10/1993 | Germany . |
| 4307421A1 | 10/1993 | Germany . |
| 0688702A2 | 12/1995 | Germany . |
| 4436139C1 | 3/1996 | Germany . |

*Primary Examiner*—Milton Nelson, Jr.
*Attorney, Agent, or Firm*—Evenson, McKeown, Edwards & Lenahan, P.L.L.C.

[57] ABSTRACT

An impact protection device in a motor vehicle having a vehicle seat has a taut tightening strap which reaches from the upper area of the backrest into the forward area of the seat cushion, so that the backrest is prevented from folding backwards in a vehicle crash. A protective element is positioned laterally on the vehicle seat, so that the impact of a sitting person moving toward the side during a vehicle crash can be damped.

27 Claims, 2 Drawing Sheets

IMPACT PROTECTION DEVICE IN A MOTOR VEHICLE HAVING A VEHICLE SEAT

BACKGROUND AND SUMMARY OF THE INVENTION

This application claims the priority of German application 196 28 108.3 filed in Germany on Jul. 12, 1996, the disclosure of which is expressly incorporated by reference herein.

The invention relates to an impact protection device in a motor vehicle having a vehicle seat with a backrest and a seat cushion, said backrest being prevented from folding backwards in the case of a vehicle crash by a taught tightening strap reaching from an upper area of the backrest into a forward area of the seat cushion.

From U.S. Pat. No. 5,295,729, an impact protection device is known which comprises a tightening strap which connects the seat backrest of a vehicle seat with its seat surface in such a manner that, in the case of a crash, because of the tightened tightening strap, the backrest cannot fold down backwards, and a person sitting in the seat cannot lose his back support. A sideways movement is limited only by the tightening strap and, in a vehicle crash, the pelvis and the abdominal area of the sitting person can move past this tightening strap and crash at a high force onto interior vehicle parts or another person sitting beside the first person.

In German Patent Document DE 44 36 139 C1, an air bag hose is described which is immersed in a seat and emerges from the seat in a vehicle crash, the diameter of the hose being increased and its longitudinal dimension being shortened. One of the two stop points can be displaced as a function of the slope of the seat backrest or is fixed by way of a resilient element. Naturally, such a flexible and flexibly disposed air bag hose cannot prevent the seat backrest from folding backwards which has the result that the air bag hose moves out of its protective position and therefore becomes ineffective. In addition, the air bag hose has the disadvantage that, because of its flexible fastening, it can yield to the loading and the sitting person can slide under it. In order to really be able to protect a side of the sitting person in a targeted manner, the air bag hose would have to have a very large diameter which would increase the manufacturing costs of the air bag hose and the gas generator. The construction having an air bag hose according to European Patent Document EP 0 688 702 A2 has the same disadvantages.

With respect to the general background concerning an impact protection by means of an air bag emerging from the seat, reference is also made to European Patent Document EP 0 565 501 A1 and German Patent Document DE 43 07 421 A1. These constructions have the disadvantage that, starting from its exit point, such a side air bag must have a comparatively large volume in order to provide a lateral protection for the sitting person which requires a large-construction gas generator with a corresponding gas capacity. In addition, when stressed, the air bag can easily yield in several directions and thereby leaves its protective position.

It is an object of the invention to improve an impact protection device for protecting a sitting person during a crash-caused sideways movement.

This object is achieved by providing an arrangement of the above mentioned type wherein a protective element is positioned laterally on the vehicle seat by means of the tightening strap such that an impact of a sitting person moving sideways during a vehicle crash is damped.

In order to be able to optimally position a protection element laterally on a vehicle seat for the person sitting there, it must be ensured that, in the case of a crash, the seat backrest does not fold backwards and thereby extensively change the position of the sitting person. This is ensured by a tightening strap which, in a crash, holds the seat backrest in the adjusted angle on the seat cushion. Simultaneously, this tightening strap is used as a secure device for positioning the protection element laterally on the vehicle seat so that, in a crash, it is also not moved out of its protective position but is nevertheless always moved along with a longitudinal displacement of the whole seat during the adjustment by the sitting person. Furthermore, this tightening strap, which is tightened at least in a crash, makes it possible to arrange a protective element in a targeted manner laterally of the sitting person where it is actually required so that the size of the protective element can be designed to be adapted to the vehicle conditions.

By means of this protective element laterally on the vehicle seat which is held in position by the taut tightening strap, in the case of a sideways movement during a frontal or rear impact, a side crash or a vehicle turnover, a sitting person is protected from a hard impact on the vehicle side wall or on a person sitting next to the first person.

As a low-cost solution for a protective element, a guard net can be used which spans a triangular surface bounded by the seat backrest and the seat cushion, and at least the side, which reaches from the seat backrest to the seat cushion in a taut manner holds the seat backrest in its position.

Directly on the tightening strap as well as on the guard net positioned by the tightening strap, a cushion can advantageously be fixed as a protective element. It is possible to generate the tightening in the tightening strap only during a crash by means of a rope tightener. For this case, it is also possible to arrange the protective element in an immersed position until the time of the crash.

The cushion can be formed by an air bag which can be inflated in the case of a crash and which, in a crash, is securely held in its protective position by means of the tightening strap or by the tightening strap with the net and also does not yield when stressed by the sitting person.

It is another advantage that the air bag can be laterally positioned on the vehicle seat in a precisely fitting manner and its size can therefore be dimensioned in a targeted manner for the impact. This saves useless air bag volume, and the size of the gas generator or gas accumulator is minimized, this gas generator or accumulator therefore also requiring less space.

The air bag may have several gas chambers which are connected with one another in a gas-carrying manner and which can be adapted to the impact situation in the vehicle with respect to their size, hardness and arrangement. In addition, the air bag can also be constructed such that, because of its shape, it spreads out in front of the sitting person in the driving direction.

Other objects, advantages and novel features of the present invention will become apparent from the following detailed description of the invention when considered in conjunction with the accompanying drawings.

DETAILED DESCRIPTION OF THE DRAWINGS

Figure 1:
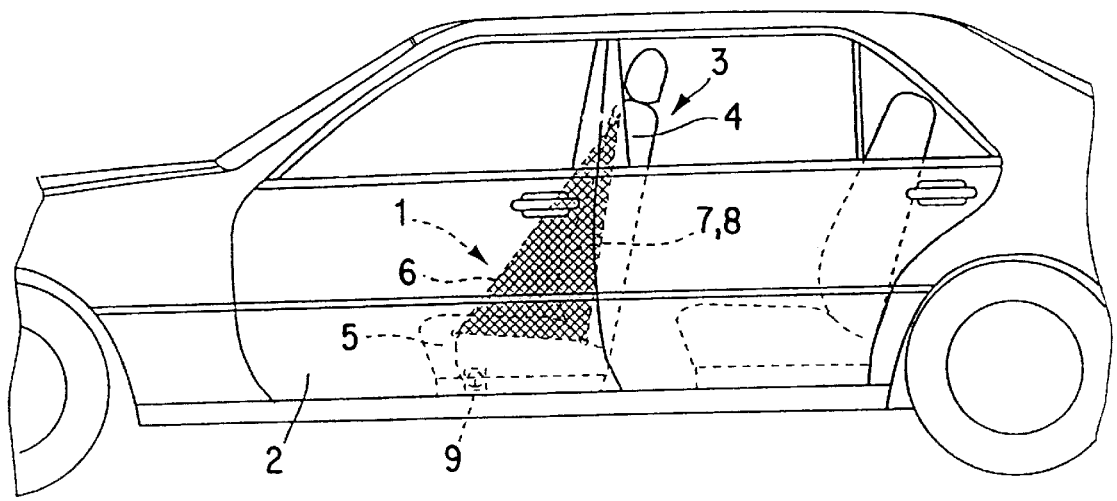
FIG. 1 is a lateral view of a motor vehicle having a tightened net which connects the seat backrest with the seat cushion, constructed according to a preferred embodiment of the present invention.

FIG. 1 illustrates an impact protection device 1 in a motor vehicle 2 on a vehicle seat 3 whose backrest 4 is prevented from folding backwards in a vehicle crash by means of a taut tightening strap 6 which reaches from the upper area of the seat backrest 4 into the forward area of the seat cushion 5. Because of the tightening strap 6, the seat backrest 4 is held in position, and a protective element 7 which by means of the tightening strap 6 is positioned laterally on the vehicle seat 3 and which in this case is formed by a guard net 8, will be fixedly aligned also in a crash. The protective element 7 dampens or prevents the impact of a sitting person moving sideways in the case of a frontal or rear impact, during a side crash or in the case of a turnover of the vehicle onto the vehicle side wall or onto a person sitting next to the first person mainly in the pelvic and abdominal area.

The guard net 8 can be stored in a folded condition laterally on the vehicle seat 3 and will then be stretched by the tightening strap 6 to a triangular surface bounded by the seat backrest 4 and the seat cushion 5. In this case, the tightening strap 6 is operated by a rope tightener 9 known per se. Furthermore, the guard net 8 may by continuously fixed by the taut tightening strap 6 in a positioned manner. The side of the guard net 8 which is stretched diagonally from the upper area of the seat backrest 4 into the forward area of the seat cushion 5 ensures that the guard net 8 fixed on the two other sides on the vehicle seat 3 cannot be pressed out of its protective position. As a result, the sitting person can also not slide past the guard net 8 or the tightening strap. Such a guard net 8 is particularly advantageous as a low-price protective element in the direction of a person sitting next to the first person.

Figure 2:
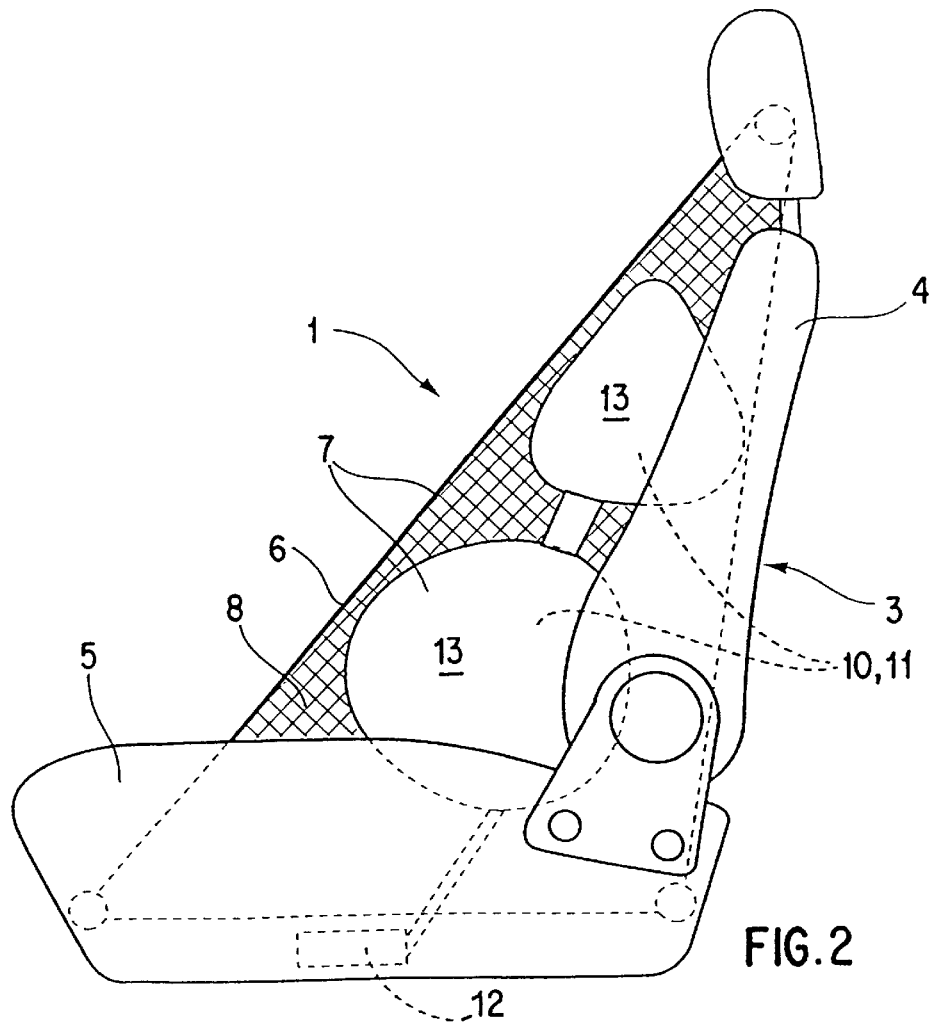
FIG. 2 is a lateral view of a seat having the net with the air bags which net is in a ready position on the opposite side, constructed according to preferred embodiments of the present invention.

FIG. 2 shows a vehicle seat 3 from the side on whose opposite side a guard net 8 is situated which is stretched open by a tightening strap 6. In this embodiment, a cushion 10 is disposed on the guard net 8 and is formed by an air bag 11 which can be inflated in a crash and is known from vehicle technology.

In the case of a crash or turnover of the motor vehicle 2, the guard net 8, to the extent that it is not already tightened, is stretched open by the rope-tightener-operated tightening strap 6 laterally of the vehicle seat 3 and simultaneously a gas generator 12 is triggered which fills the air bag 11. A person sitting on the seat cushion is protected by these protective elements 7, that is, by the guard net 8 and the air bag 11, from a hard impact onto the vehicle side wall or onto a person sitting next to the first person.

In this case, the taut tightening strap 6 holds the protective elements 7 in the predefined position so that the sitting person cannot slide past them. The size of the protective elements 7 can therefor be adapted precisely to the situation in the vehicle.

For this purpose, the air bag 11 is divided into two gas chamber 13 which are connected with one another in a gas-carrying manner and can therefore be filled from the one gas generator 12.

Furthermore, it is possible that, because of its shape, an air bag 11 spreads out in front of the sitting person in the driving direction, and that the air bag 11 without the guard net 8 is held directly by the tightening strap 6 and by the vehicle seat 3.

Figure 3:
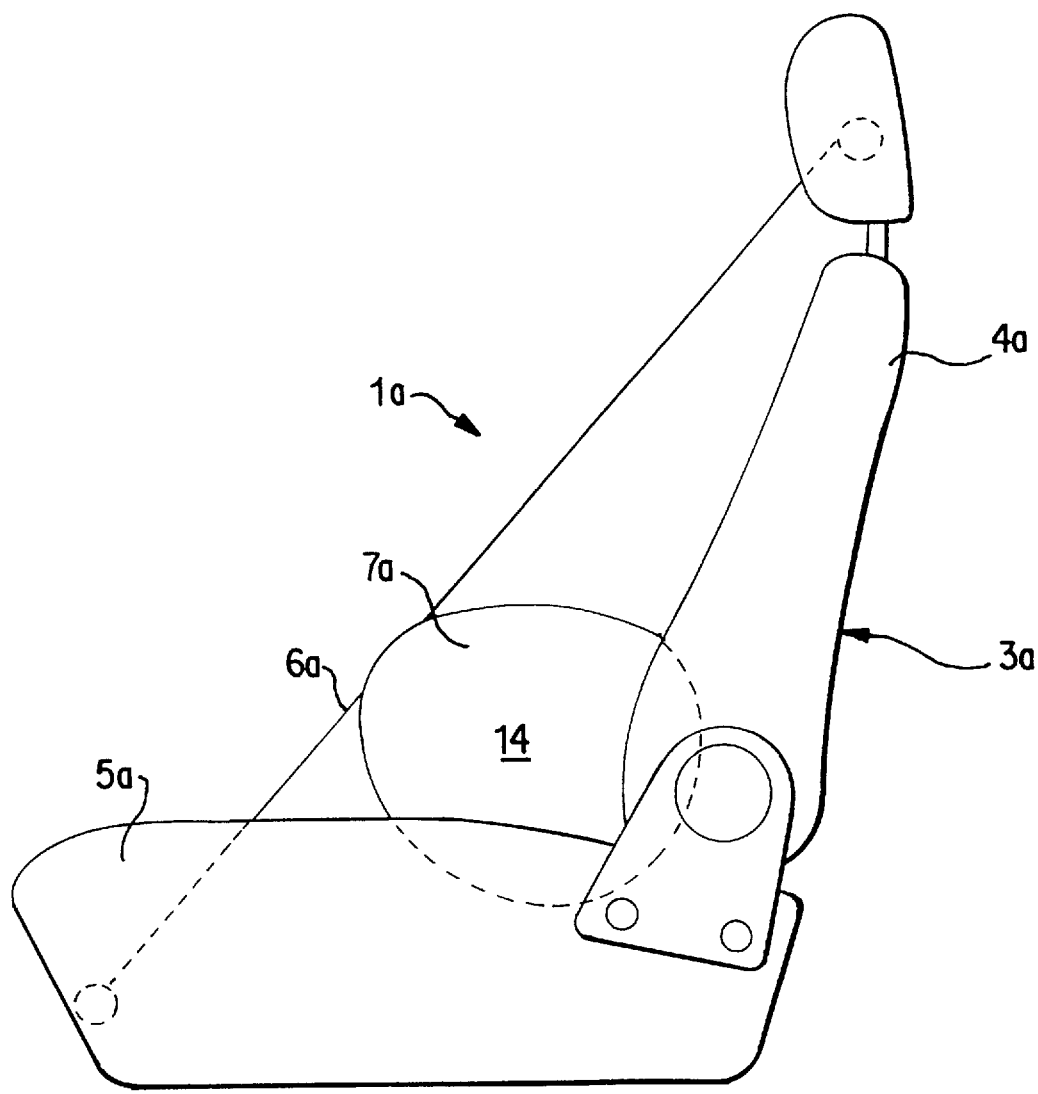
FIG. 3 is a lateral view of a seat having a tightening strap connected to a cushion protective element, constructed according to preferred embodiments of the present invention.

Another preferred embodiment is illustrated in FIG. 3. Elements which are the same or similar to those of previous preferred embodiments are so designated by the suffix "a". An impact protection device 1a on a vehicle seat 3a whose backrest 4a is prevented from folding backwards in a vehicle crash by means of a taut tightening strap 6a which reaches from the upper area of the seat backrest 4a into the forward area of the seat cushion 5a. Here, at least one cushion 14 is disposed as the protective element 7a on the tightening strap 6a.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Impact protection device in a motor vehicle having a vehicle seat with a backrest and a seat cushion, the backrest being prevented from folding backwards in the case of a vehicle crash by a taut tightening strap reaching from an upper area of the backrest into a forward area of the seat cushion, wherein a protective element is positioned laterally on the vehicle seat by means of the tightening strap such that an impact of a sitting person moving sideways during a vehicle crash is damped, and wherein the protective element includes a guard net fixed on the tightening strap, by means of which guard net a triangular surface is spanned which is bounded by the backrest and the seat cushion.

2. Impact protection device according to claim 1, wherein at least one cushion is disposed on the guard net.

3. Impact protection device according to claim 2, wherein the cushion is formed by an air bag which can be inflated in a crash.

4. Impact protection device according to claim 3, wherein the air bag has several gas chambers which are mutually connected in a gas-carrying manner.

5. Impact protection device according to claim 3, wherein the air bag is shaped to spread out in front of the sitting person in a driving direction.

6. Impact protection device in a motor vehicle having a vehicle seat with a backrest and a seat cushion, the backrest being prevented from folding backwards in the case of a vehicle crash by a taut tightening strap reaching from an upper area of the backrest into a forward area of the seat cushion, wherein a protective element is positioned laterally on the vehicle seat by means of the tightening strap such that an impact of a sitting person moving sideways during a vehicle crash is damped, wherein at least one cushion is disposed as the protective element on the tightening strap, wherein the cushion is formed by an air bag which can be inflated in a crash, and wherein the air bag is shaped to spread out in front of the sitting person in a driving direction.

7. Impact protection device in a motor vehicle having a vehicle seat with a backrest and a seat cushion, the backrest being prevented from folding backwards in the case of a vehicle crash by a taut tightening strap reaching from an upper area of the backrest into a forward area of the seat cushion, wherein a protective element is positioned laterally on the vehicle seat by means of the tightening strap such that an impact of a sitting person moving sideways during a vehicle crash is damped, wherein at least one cushion is disposed as the protective element on the tightening strap, wherein the cushion is formed by an air bag which can be inflated in a crash, and wherein the air bag has several gas chambers which are mutually connected in a gas-carrying manner.

8. Impact protection device for a motor vehicle having a vehicle seat with a backrest and a seat cushion, comprising:

a tightening strap, and a protective element, wherein the tightening strap extends between and is adapted to be connected to an upper area of the backrest and a forward area of the seat cushion and serves to prevent the backrest from folding backwards in the case of a vehicle crash, wherein a laterally open area is bounded by the tightening strap, the backrest and the seat cushion, wherein the protective element is positioned laterally on the vehicle seat and comprises a passenger impact surface area which extends over at least a portion of the laterally open area such that an impact of a passenger in the vehicle seat moving laterally is damped by the protective element during a vehicle crash.

9. Impact protection device according to claim 8, further comprising a rope tightener, wherein the rope tightener tightens the tightening strap only in a vehicle crash.

10. Impact protection device according to claim 8, wherein the vehicle seat is disposed adjacent a vehicle side wall and the protective element protects the passenger in the seat from a hard impact against the vehicle side wall.

11. Impact protection device according to claim 8, wherein the protective element comprises a guard net.

12. Impact protection device according to claim 8, wherein at least one cushion is disposed as the protective element on the tightening strap.

13. Impact protection device according to claim 8, wherein the vehicle seat is disposed adjacent a second vehicle seat and the protective element protects the passenger in the vehicle seat from a hard impact against a passenger sitting in the second vehicle seat.

14. Impact protection device according to claim 8, wherein the protective element comprises a cushion.

15. Impact protection device according to claim 14, wherein the cushion is formed by an inflatable air bag.

16. Impact protection device according to claim 15, wherein the air bag has several gas chambers which are mutually connected in a gas-carrying manner.

17. Impact protection device according to claim 8, wherein the protective element comprises a guard net fixably supporting a cushion.

18. Impact protection device according to claim 17, wherein the cushion is formed by an inflatable air bag.

19. Impact protection device according to claim 18, wherein the air bag has several gas chambers which are mutually connected in a gas-carrying manner.

20. A vehicle seat assembly for a motor vehicle, comprising:

a vehicle seat, which comprises a backrest and a seat cushion, a tightening strap, and a protective element, wherein the tightening strap extends between and is connected to an upper area of the backrest and a forward area of the seat cushion and serves to prevent the backrest from folding backwards in the case of a vehicle crash, wherein a laterally open area is bounded by the tightening strap, the backrest and the seat cushion, wherein the protective element is positioned laterally on the vehicle seat and comprises a passenger impact surface area which extends over at least a portion of the laterally open area such that an impact of a passenger in the vehicle seat moving laterally is damped by the protective element during a vehicle crash.

21. Vehicle seat assembly according to claim 20, wherein the protective element includes a cushion fixably supported by a guard net.

22. Vehicle seat assembly according to claim 20, wherein the protective element is connected to or supported by the tightening strap.

23. Vehicle seat assembly according to claim 20, wherein the vehicle seat is disposed adjacent a vehicle side wall and the protective element protects the passenger in the seat from a hard impact against the vehicle side wall.

24. Vehicle seat assembly according to claim 20, wherein at least one cushion is disposed as the protective element on the tightening strap.

25. Vehicle seat assembly according to claim 20, wherein the vehicle seat is disposed adjacent a second vehicle seat and the protective element protects the passenger in the vehicle seat from a hard impact against a passenger sitting in the second vehicle seat.

26. Vehicle seat assembly according to claim 20, wherein the protective element includes a guard net fixed to the tightening strap.

27. Vehicle seat assembly according to claim 26, wherein the protective element includes an inflatable air bag carried by the guard net.

* * * * *